(12) United States Patent
Spear et al.

(10) Patent No.: US 7,106,714 B2
(45) Date of Patent: Sep. 12, 2006

(54) METHOD AND APPARATUS FOR TRANSMISSION OF CONTROL DATA IN A PACKET DATA COMMUNICATION SYSTEM

(75) Inventors: Stephen L. Spear, Skokie, IL (US); Mark E. Pecen, Palatine, IL (US); Sanjay Gupta, Lakewood, IL (US)

(73) Assignee: Motorola, Inc., Schaumburg, IL (US)

( * ) Notice: Subject to any disclaimer, the term of this patent is extended or adjusted under 35 U.S.C. 154(b) by 17 days.

(21) Appl. No.: 10/721,542

(22) Filed: Nov. 25, 2003

(65) Prior Publication Data

US 2005/0111430 A1    May 26, 2005

(51) Int. Cl.
*H04J 3/00* (2006.01)
*H04J 3/12* (2006.01)

(52) U.S. Cl. .................. 370/336; 370/345; 370/522
(58) Field of Classification Search ............... 370/328, 370/329, 431; 455/34.2
See application file for complete search history.

(56) References Cited

U.S. PATENT DOCUMENTS

| | | | | |
|---|---|---|---|---|
| 5,442,809 A * | 8/1995 | Diaz et al. | ................... | 455/511 |
| 5,541,978 A * | 7/1996 | Brunner et al. | ............. | 455/423 |
| 5,590,400 A * | 12/1996 | Lopponen | ................... | 455/509 |
| 6,430,163 B1 * | 8/2002 | Mustajarvi | ................... | 370/310 |
| 6,438,114 B1 * | 8/2002 | Womack et al. | ............. | 370/329 |
| 6,577,619 B1 | 6/2003 | Savuoja | | |
| 6,771,987 B1 * | 8/2004 | Dam et al. | ................ | 455/562.1 |
| 2001/0030949 A1 * | 10/2001 | Molno et al. | ................ | 370/329 |

2003/0063598 A1    4/2003    Huo

OTHER PUBLICATIONS

3GPP TS 04.18 v8.12.0 (Dec. 2001), 3$^{rd}$ Generation Partnership Project; Technical Specification Group GSM EDGE Radio Access Network; Mobile radio interface layer 3 specification, Radio Resource Control Protocol (Release 1999), 2001, Technical Specification, 3 GPP Organization Partners (AROB. CWTS. ETSI, Ti, TTA. TTC), pp. 1-92.
3GPP TS 23.060 v5.0.0 (Jan. 2002), 3$^{rd}$ Generation Partnership Project; Technical Specification Group Services and System Aspects; General Packet Radio Service (GPRS); Service description; Stage 2 (Release 5), 23002, Technical Specification, 3GPP Organizational Partners (ARIB, CWTS, ETSI, TI, TTA, TTC). pp. 1-18, 141-156.
3GPP TS 45.002 v5.3.0 (Nov. 2001), Release 5, Technical Specification, pp. 15-16.

(Continued)

*Primary Examiner*—Huy D. Vu
*Assistant Examiner*—Daniel Ryman
(74) *Attorney, Agent, or Firm*—Steven A. May (57) ABSTRACT

A communication system comprising a mobile station and a network implements a persistent packet data control channel that provides for a continuous exchange of control information, such as system information (SI) messages and handoff-related information. The mobile station implements the persistent packet data control channel by mapping the persistent packet data control channel to a packet associated control channel when a packet associated control channel is available and to a virtual associated control channel when a packet associated control channel is not available. The virtual associated control channel allows the mobile station to pass control information to network in the absence of an uplink Temporary Block Flow (TBF).

36 Claims, 5 Drawing Sheets

OTHER PUBLICATIONS

3GPP TS 44.060 v4.4.0 (Dec. 2001), Release 4, Technical Specification, pp. 17-42.

Spear, Stephen et al.: "*Method and Apparatus for Associating a continuous control channel to GSM GPRS/EDGE packet domain*", Jun. 3, 2003, pp. 1-11.

3GPP TS 45.008 v5.4.0 (Nov. 2001), $3^{RD}$ Generation Partnership Project; Technical Specification Group GSM/EDGE Radio Access Network; Radio subsystem link control (Release 5), Global System for Mobile Communications, 3 GPP Organization Partners (AROB. CWTS. ETSI, Ti, TTA. TTC), pp. 1-101.

* cited by examiner

METHOD AND APPARATUS FOR TRANSMISSION OF CONTROL DATA IN A PACKET DATA COMMUNICATION SYSTEM

FIELD OF THE INVENTION

The present invention relates generally to packet data communication systems, and, in particular, to transmission of control data in a packet data communication system.

BACKGROUND OF THE INVENTION

The General Packet Radio Service (GPRS) and Enhanced Data for Global Evolution (EDGE) protocols for the Global System for Mobile Communication (GSM) have introduced a capability of the user data interchange into mobile wireless products. GPRS, and its superset, EDGE, permit efficient use of radio and network resources when data transmission characteristics are packet-based, intermittent and non-periodic, possibly frequent with small transfers of data, for example, less than 500 octets, or possibly infrequent with large transfers of data, for example, more than several hundred kilobytes. User applications that may utilize GPRS/EDGE protocols may include Internet browsers, electronic mail, file transfers, and other applications involving transfers of data.

Figure 1:
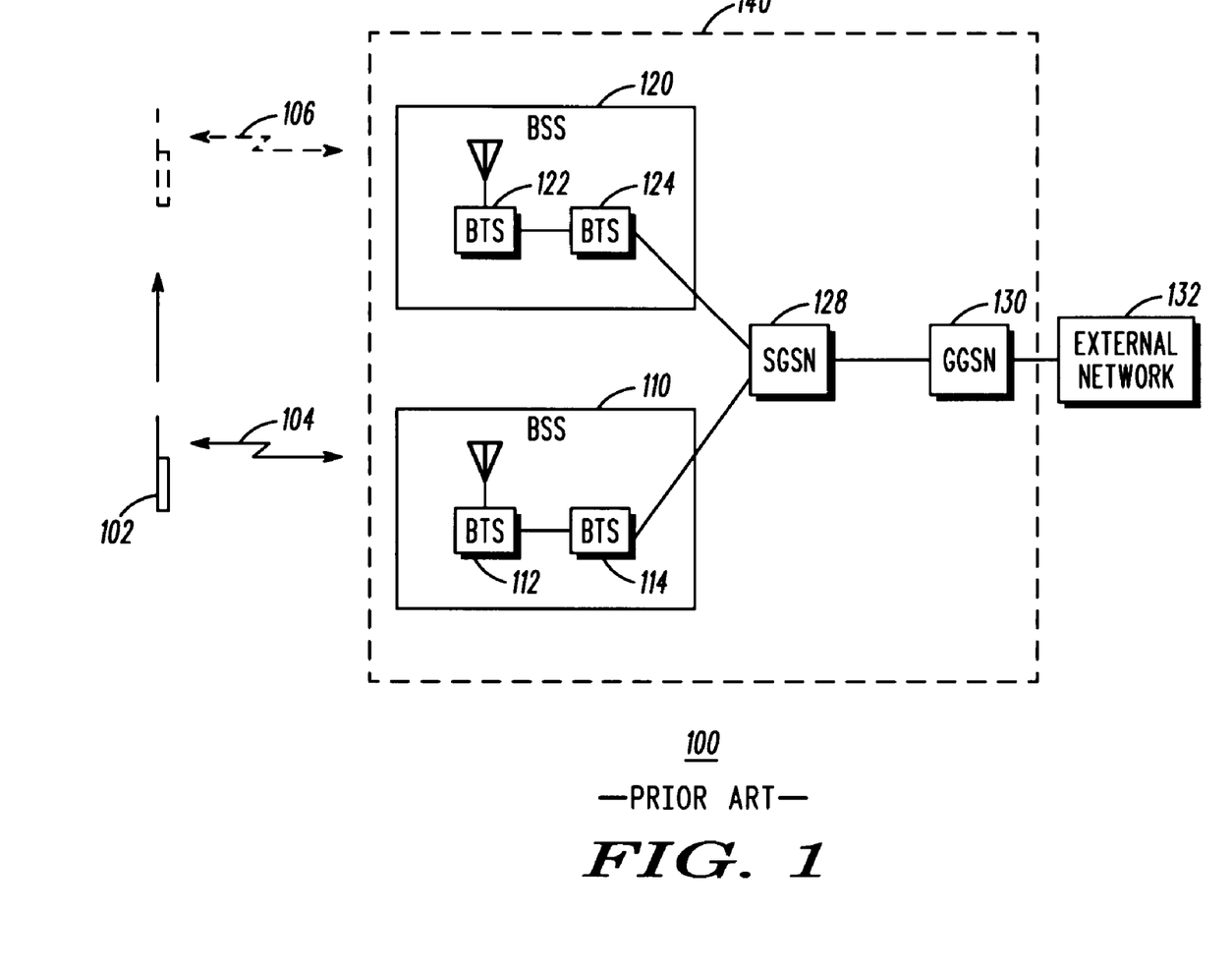
FIG. 1 is a block diagram of a wireless communication system of the prior art.

FIG. 1 is a block diagram of an exemplary GPRS/EDGE communication system 100. Communication system 100 includes multiple Base Station Systems (BSSs) 110, 120 that each provides communication services to a respective coverage area, or cell. Each BSS 110, 120 includes a respective Base Transceiver Station (BTS) 112, 122 that is coupled to a respective Base Station Controller (BSC) 114, 124. Each BSS 110, 120 is coupled to a Serving GPRS Support Node (SGSN) 128, which SGSN is further coupled to a Gateway GPRS Support Node (GGSN) 130 and, via the GGSN, to an external network 132. BSSs 110, 120, SGSNs 116, 126, and GGSN 130 are collectively referred to as a communication system network 140. Communication system 100 further includes an MS 102 that resides in a coverage area, or cell, serviced by a first, source BSS 110 of the multiple BSSs 110, 120. Source BSS 110 provides communication services to MS 102 via an air interface, or wireless communication link, 104 that includes a downlink and an uplink.

As MS 102 moves around in communication system 100, the MS may experience deterioration in radio frequency (RF) signal conditions or congestion conditions with respect to the communication services provided to the MS by source BSS 110. As a result, the MS 102 may decide to perform a cell reselection. In order to facilitate a selection of a new cell, such as a cell associated with BSS 120, MS 102 and network 140 may exchange System Information (SI) messages and measurement information related to the neighboring cells. However, the system provided by the GPRS/EDGE protocols provides only for a discontinuous exchange of such information. That is, such information is exchanged in data packets in GPRS/EDGE systems via a Packet Associated Control Channel (PACCH). The PACCH is a control channel that comprises blocks of four sequential bursts that are stolen from an associated PDTCH. As a result, the PACCH exists only as a portion of a Temporary Block Flow (TBF) comprising data that is being transferred via the PDTCH. When there is no TBF, for example, when a user of MS 102 is receiving rather than sending, the uplink PACCH goes away.

Originally, GPRS/EDGE communication systems were conceived as means of generating additional revenues for system operators based on their excess capacity during non-peak usage period. User applications were originally envisioned to include Internet browsers, electronic mail, file transfers and other applications for which best efforts data transfer are appropriate. At that time, the industry did not anticipate real-time applications, such as streaming and Push-to-Talk (PTT), making use of GPRS/EDGE as an underlying wireless transport vehicle. As a result and in order to maintain system simplicity, no real-time handover procedure is specified for best effort packet data transfers over GPRS/EDGE. Instead, cell reselection is achieved by allowing MS 102 to reselect cells as it does in idle mode, which causes the MS to abort its packet transfer on one cell and completely re-establish the ongoing packet transfer on the new cell. In the meanwhile, until the packet transfer is re-established on the new cell, all data flows are put on hold. As a result, a reselection between cells typically interrupts the flow of data in both directions for 500 milliseconds (ms) to approximately four seconds if the new cell resides in a same Routing Area (RA) as the old cell, that is, if a target BSS is serviced by a same SGSN as a source BSS. If the new cell resides in a different RA, that is, if the target BSS is serviced by a different SGSN that the source BSS, then the impact is typically 8 seconds.

Current metrics show that in an urban area, cell reselection takes place approximately two to four times per minute, even with the MS physically stationary. The lack of a true synchronized handover for a GPRS/EDGE communication system such as system 100 means that the continuity of both uplink and downlink data is compromised each time a new cell is reselected, either autonomously or under the control of network 140. For applications such as PTT, this means that during a one-way conversation, when either a talker or a listener reselects to a new cell, the listener may lose up to eight seconds of voice information and any associated control information conveyed in association with the voice information.

To overcome these problems of data flow disruptions during cell reselection, a true synchronized handover is being considered for the packet domain. However, the introduction of such a packet domain handover is hindered by the fact that there exists no equivalent in GPRS/EDGE communication systems to a Slow Associated Control Channel (SACCH) of circuit-switched communication systems over which handover measurements, typically pilot signal measurements, may flow during, and between, voice data transfers comprising a single application session, such as PTT.

Therefore, a need exists for a method and apparatus that provides for a persistent flow of control data associated with a packet data traffic channel during, and between, packet data transfers comprising a single application session in a GPRS communication system.

DETAILED DESCRIPTION OF THE INVENTION

To address the need for a method and apparatus that provides for a persistent flow of control data associated with a packet data traffic channel during, and between, packet data transfers comprising a single application session in a General Packet Radio Service (GPRS)/Enhanced Data for Global Evolution (EDGE) communication system, a communication system comprising a mobile station and a network implements a persistent packet associated control channel that provides for a continuous exchange of control information, such as system information (SI) messages and handoff-related information. The mobile station implements the persistent packet associated control channel by mapping the persistent packet associated control channel to a packet associated control channel when a packet associated control channel is available and to a virtual associated control channel when a packet associated control channel is not available. The virtual associated control channel allows the mobile station to pass control information to network in the absence of an uplink Temporary Block Flow (TBF).

Generally, an embodiment of the present invention encompasses a method for transmitting control data in a packet data communication system. The method includes, when a packet associated control channel is available, transmitting the control data via the packet associated control channel, and when a packet associated control channel is not available, transmitting the control data via a timeslot allocated for the transmission of the control data.

Another embodiment of the present invention encompasses a mobile station that includes at least one memory device and a processor operably coupled to the at least one memory device. The at least one memory device maintains information concerning a packet associated control channel and a timeslot allocated for transmission of control data when the packet associated control channel is not available. The processor conveys the control data via the packet associated control channel when the packet associated control channel is available and conveys the control data via the timeslot when the packet associated control channel is not available.

Still another embodiment of the present invention encompasses a method for transmitting control data in a packet data communication system. The method includes receiving a request for a persistent, packet associated control channel and, in response to receiving the request, conveying an allocation of a timeslot for use in transmitting the control data when a packet associated control channel is not available.

Figure 2:
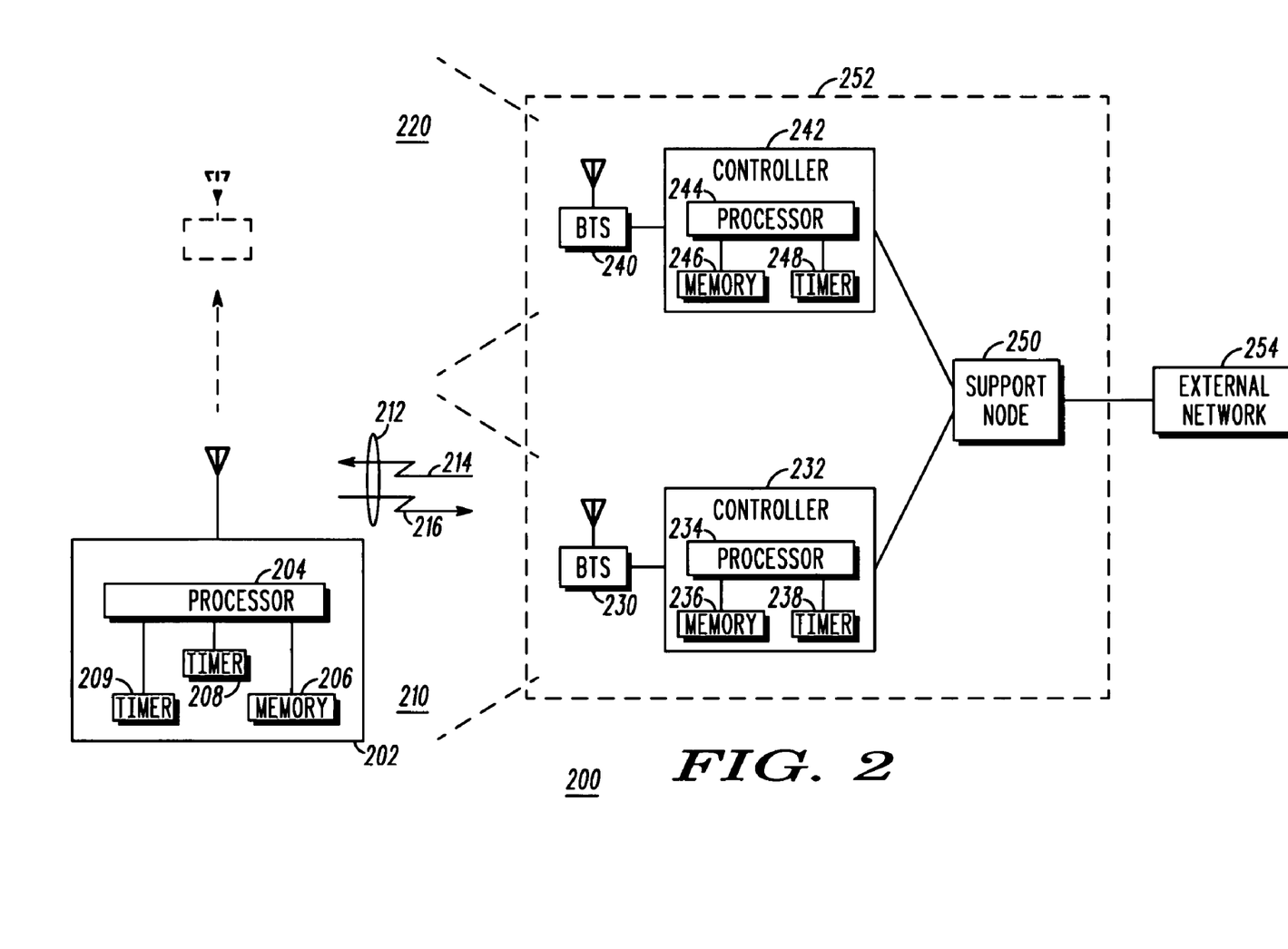
FIG. 2 is a block diagram of a wireless communication system in accordance with an embodiment of the present invention.

Yet another embodiment of the present invention encompasses a network controller that includes a processor that receives a request for a persistent, packet associated control channel and, in response to receiving the request, conveys an allocation of a timeslot for use in transmitting control data when a packet associated control channel is not available, The present invention may be more fully described with reference to FIGS. 2–6. FIG. 2 is a block diagram of a wireless communication system 200 in accordance with an embodiment of the present invention. Communication system 200 includes multiple Base Transceiver Stations (BTSs) 230, 240 (two shown). Each BTS 230, 240 is operably coupled to a network controller 232, 242. Each network controller 232, 242 may comprise one or more of a Base Station Controller (BSC), a Packet Control Unit (PCU), and a Packet Control Function (PCF) and the functions of the network controller may be implemented in any one of such elements or may be distributed among such elements. In other embodiments of the present invention, each BTS 230, 240 may be coupled to a same network controller, or may share some elements of a network controller, such as a PCU, and may be separately coupled to other elements of a network controller, such as BSCs. Each BTS 230, 240 provides wireless communication services to mobile stations (MSs) located in a respective coverage area, or cell, 210, 220 associated with the BTS.

Communication system 200 further includes at least one mobile station (MS) 202 that is provided communication services by a source BTS, that is, BTS 230, that services a cell 210 in which the MS resides. MS 202 and BTS 230 communicate via an air interface 212 comprising a downlink 214 and an uplink 216. Downlink 214 comprises multiple logical channels, including at least one broadcast channel, at least one traffic channel, and at least one control channel. Uplink 216 also comprises multiple logical channels, including an access channel, at least one traffic channel, and at least one control channel.

Communication system 200 further includes a Support Node 250 coupled to each network controller 232, 242. Support Node 250 typically includes one or more Serving GPRS Support Nodes (SGSNs) that are each coupled to one or more Gateway GPRS Support Nodes (GGSNs). However, the precise architecture of Support Node 250 is up to an operator of communication system 200 and is not critical to the present invention. Together, the multiple BTSs 230, 240, the multiple network controllers 232, 242, and Support Node 250 are collectively referred to herein as a communication system network 252.

Each of MS 202 and controllers 232 and 242 includes a respective processor 204, 234, 244 that is operably coupled to, or associated with, a respective at least one memory device 206, 236, 246. Each of processors 204, 234, and 244 comprises one or more microprocessors, microcontrollers, digital signal processors (DSPs), combinations thereof or such other devices known to those having ordinary skill in the art. Each of the at least one memory devices 206, 236, and 246 comprises at least one memory device such as a random access memory (RAM), a dynamic random access memory (DRAM), and/or a read only memory (ROM) or equivalents thereof, that maintains data and programs that may be executed by the corresponding processor. MS 202 further includes multiple timers 208, 209 associated with processor 204, and each of controllers 232 and 242 further includes a respective timer 238, 248 associated with a respective processor 234, 244.

Communication system 200 comprises a wireless packet data communication system. In order for MS 202 to establish a packet data connection with an external network such as external network 254, each of MS 202, the multiple BTSs 230, 240, the multiple network controllers 232, 242, and support node 250 operates in accordance with the General Packet Radio Service (GPRS) and Enhanced Data for Global Evolution (EDGE) communication system standards, and in particular with 3 GPP (Third Generation Partnership Project) TS (Technical Specification) 23.060 v5.0.0, 3GPP TS 44.060 v4.4.0, 3GPP TS 45.002 v5.3.0, 3GPP TS 45.008 v5.4.0, 3GPP TS 04.18 v8.12.0, which standards are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France. The GPRS and EDGE standards specify wireless telecommunications system operating protocols, including radio system parameters and call processing and handoff procedures, for GPRS and EDGE communication systems. By operating in accordance with the GPRS and EDGE standards, a user of MS 202 can be assured that MS 202 will be able to communicate with network 252 and establish a packet data communication link with an external network 254 via network 252.

GPRS communication systems, such as communication system 200, use a combination of frequency and time division multiplexing to define a physical channel, with the result that a physical channel is defined as a sequence of radio frequency channels and timeslots. The physical channel comprises multiple logical channels, wherein each logical channel comprises a portion of the physical channel, such as a portion of a timeslot, a timeslot, or multiple timeslots, that is allocated for conveyance of control or traffic data. Typically, a radio frequency channel comprises eight time slots, which eight time slots constitute a frame. Each timeslot within a frame is numbered with a timeslot number (TN), typically in a range from 0 to 7, and each frame is numbered by a frame number (FN), typically in a range from 0 to 2,715,647. In addition, a 52-mulitframe, comprising 52 frames, is typically used to support packet data traffic and associated control channels and a 51-multiframe, comprising 51 frames, is typically used to support broadcast and common control channels.

When MS 202 is actively engaged in a packet data communication session, the MS conveys data packets to, and receives data packets from, serving BTS 230. In addition, MS 202 maintains in the at least one memory device 206 of the MS a Neighbor List comprising logical channels associated with neighboring BTSs, such as BTS 240, that are potential handoff or reselection candidates for MS 202. Typically, the Neighbor List comprises a list of broadcast channels (BCCH) associated with each of multiple cells of the neighboring BTSs, such as a broadcast channel associated with BTS 240.

In order to determine whether to engage in a cell reselection, MS 202 monitors each broadcast channel identified in the Neighbor List. MS 202 determines a signal quality metric, such as a signal strength, a signal-to-noise ratio (SNR), or a bit error rate (BER), with respect to each monitored signal and further with respect to signals received from serving BTS 230. Based on the determined signal quality metrics, MS 202 determines whether to initiate a cell reselection. For example, MS 202 may compare each determined signal quality metric to a signal quality metric threshold that is maintained in the at least one memory device 206 of the MS. When a signal quality metric determined with respect to serving BTS 230 compares unfavorably, with the signal quality metric threshold, for example, is less than the threshold, and a signal quality metric determined with respect to a neighboring BTS, that is, BTS 240, compares favorably with the signal quality metric threshold, for example, exceeds the threshold, then MS 202 may determine to initiate a cell reselection to the neighboring cell 220 serviced by BTS 240.

In order to facilitate a real-time handover of MS 202 from cell 210 to cell 220 and to further facilitate a continuous exchange of system information and handoff-related information between the MS and network 252 so that a handoff may occur at an appropriate moment rather than, as in the prior art, only at discrete moments when such information may be exchanged, communication system 200 provides a continuous, uplink control channel that provides for a continuous exchange of control information, such as system information (SI) messages and handoff-related information, related to a packet data traffic channel that is concurrently utilized by the MS for an exchange of data packets comprising user information.

Figure 3:
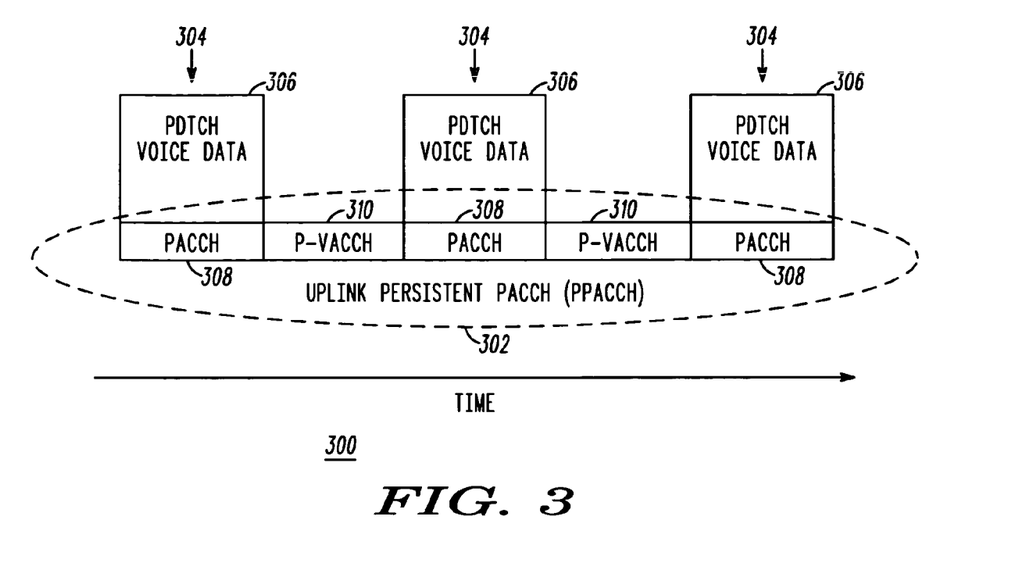
FIG. 3 is a block diagram of a packet data channel that comprises a continuous, persistent packet data control channel in accordance with an embodiment of the present invention.

FIG. 3 is a block diagram of a Packet Data Channel (PDCH) 300 that comprises a continuous, persistent packet data control channel 302, that is, a Persistent Packet Associated Control Channel (PPACCH), in accordance with an embodiment of the present invention. PPACCH 302 is associated with a Packet Data Traffic Channel (PDTCH) 306 that is utilized by MS 202 during an application session, such as a PTT session. When MS 102 is actively engaged in an application session, the MS conveys user information, such as voice data, to network 252 via a Packet Data Traffic Channel (PDTCH) 306. PDTCH 306 comprises a portion of each of multiple discrete Temporary Block Flows (TBFs) 304 (three shown). Each TBF 304 further includes a Packet Associated Control Channel (PACCH) 308. PACCH 308 comprises a control channel that comprises blocks of four sequential bursts that are stolen from an associated PDTCH 306 and that is used by MS 202 and network 252 to exchange System Information (SI) messages and measurement information related to the associated PDTCH. As shown in FIG. 3, since PACCH 308 exists only as a portion of a Temporary Block Flow (TBF) 304 comprising voice data that is being transferred via PDTCH 306, when no voice is being transferred and there is no TBF there is no PACCH. For example, when a user of MS 202 is listening rather than speaking, PACCH 308 goes away.

In order to provide a continuous uplink control channel that provides for a continuous exchange of control information, such as system information (SI) messages and handoff-related information, communication system 200 provides a Persistent PACCH (PPACCH) 302 that maps to PACCH 308 when the PACCH is available and to a Packet Virtual Associated Control Channel (P-VACCH, or VACCH) 310 when PACCH 308 is not available. As shown in FIG. 3, PPACCH 302 persists over the course of the application session, even in the absence of an uplink TBF 304. That is, PPACCH is a logical channel that is carried by PACCH 308 when the PACCH is active and by VACCH 310 when PACCH is not available, such as between uplink TBFs 304. VACCH 310 is an uplink channel assignment that is used for control purposes and that allows an MS, such as MS 202, without an uplink TBF to pass information to network 252.

Figure 4:
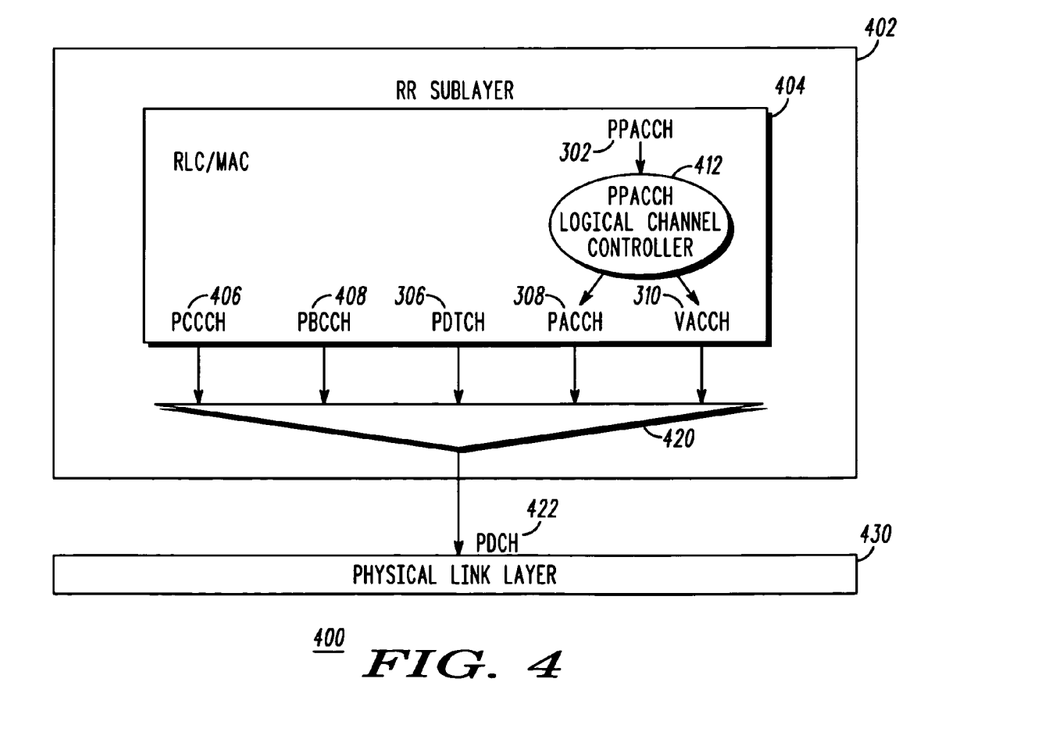
FIG. 4 is a block diagram of an exemplary protocol architecture of a radio interface that implements a persistent packet data control channel in accordance with an embodiment of the present invention.

PPACCH 302 is an uplink control channel that originates at MS 202 and terminates at a controller serving the MS, that is, controller 232. Referring now to FIG. 4, PPACCH 302 is implemented on a mobile side of communication system 200 by a PPACCH logical channel controller 412 that is implemented in processor 204 of MS 202. FIG. 4 is a block diagram of an exemplary protocol architecture of a radio interface 400 that implements PPACCH 302 in accordance with an embodiment of the present invention. Radio interface 400 is implemented in processor 204 of MS 202. On the network side of communication system 200, a corresponding radio interface is implemented in serving BTS 230 and associated controller 232 and support node 250.

Radio Interface 400 comprises a Radio Resource (RR) Sublayer 402 that resides above a Physical Link Layer 430. RR Sublayer 402 comprises a Radio Link Control (RLC)/Medium Access Control (MAC) function 404 that provides services for the transfer of Packet Data Units (PDUs) received from upper layers (not shown) and utilizes the services of Physical Link Layer 430 to transfer the PDUs. The layers and functions illustrated in FIG. 4 are merely provided for the purpose of illustrating the principles of the present invention and are not intended to depict a comprehensive architecture of a radio interface of MS 202 and controller 234, as one of ordinary skill in the art realizes that a radio interface, such as radio interface 400, may further include other layers, for example, a Mobility Management (MM) Sublayer, a Logical Link Control (LLC) Sublayer, and a Data Link Layer.

An RLC function of RLC/MAC function 404 includes segmentation and reassembly of PDUs into RLC/MAC blocks and for error correction procedures enabling a retransmission of unsuccessfully delivered blocks. A MAC function of RLC/MAC function 404 includes functions related to the management of shared communication resources, such as allowing an MS, such as MS 202, to use several communication channels in parallel, that is, to use several timeslots within a same TDMA frame. The MAC function supports the provision of TBFs 304 that provide for point-to-point transfer of signaling information and user data between network 252 and MS 202. A TBF 304 is used by network 252 and MS 202 to support a unidirectional transfer of Packet Data Units (PDUs) and comprises multiple RLC/MAC blocks carrying one or more upper layer PDUs. As illustrated by FIG. 3, a TBF 304 is temporary and is maintained only until all such RLC/MAC blocks have been transmitted and, in acknowledged mode, successfully acknowledged.

RLC/MAC function 404 provides for transport of multiple logical channels. On network 252 side of communication system 200, the multiple logical channels originate (in the case of downlink channels) and terminate (in the case of uplink channels) in controller 232, and in particular in processor 234 of controller 232. The logical channels are multiplexed by a multiplexing function 420 included in the RLC/MAC function and transferred over a Packet Data Channel (PDCH) 422, that is, a physical channel allocated to carry the above logical channels. A first logical channel 406 of the multiple logical channels comprises a Packet Common Control Channel (PCCCH) that provides, on the downlink, for a paging of MS 202 or to notify the MS of a call, on the uplink to request an allocation of a traffic channel, that is, a Packet Data Traffic Channel (PDTCH), and again on the downlink to notify MS 202 of the allocated channel. A second logical channel 408 of the multiple logical channels comprises a Packet Broadcast Control Channel (PBCCH) that is used to broadcast parameters used by MS 202 to access network 252 for packet transmission operation. A third logical channel 306 of the multiple logical channels comprises the PDTCH, which channel corresponds to the communication channel allocated to a single MS for user data transmission. However, as noted above, the PACCH merely comprises bits stolen from the PDTCH and accordingly the PACCH information, such as system information and measurement information, can be transferred only when there is a PDTCH 306. Information concerning the PCCCH, PBCCH, and PDTCH is maintained in the respective at least one memory devices 206, 236 of MS 202 and controller 232.

A fourth logical channel of the multiple logical channels comprises the PPACCH 302. As noted above, PPACCH is a continuous uplink control channel that provides for a continuous exchange of control information, such as system information (SI) messages and handoff-related information. PPACCH logical controller 412, which is implemented in processor 204 of MS 202, maps PPACCH 302 to a fifth logical channel, that is, PACCH 308, when the PACCH is available and to a sixth logical channel, that is, VACCH 310, when PACCH 308 is not available. That is, PPACCH is a logical channel that is carried by PACCH 308 when the PACCH is active and by VACCH 310 when PACCH is not available.

Figure 5:
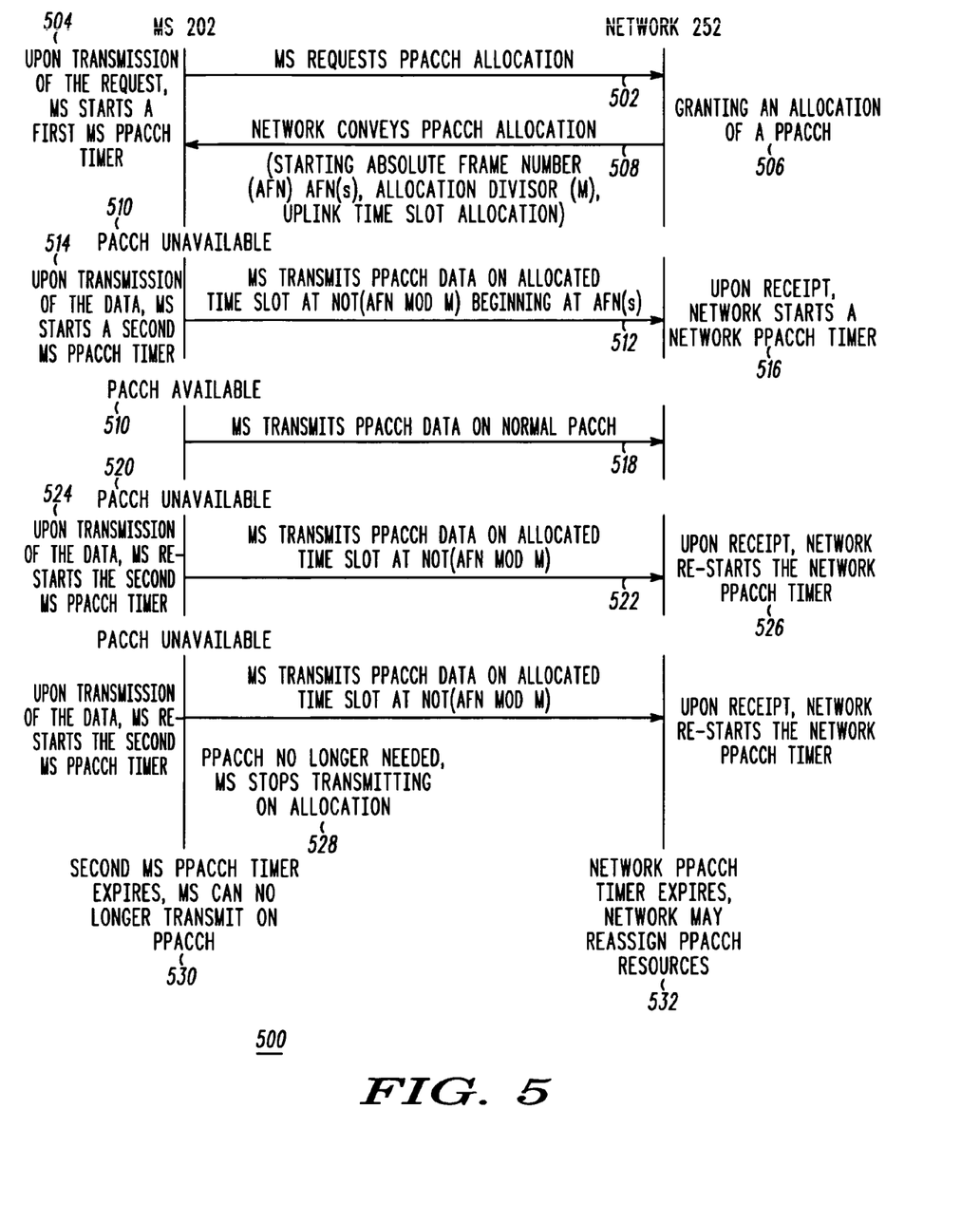
FIG. 5 is a signal flow diagram of a method for implementing a continuous, persistent packet data control channel in accordance with an embodiment of the present invention.

FIG. 5 is a signal flow diagram 500 illustrating a method for implementing PPACCH 302 in communication system 200 in accordance with an embodiment of the present invention. In the embodiment depicted in FIG. 5, network 252 implements a PPACCH 302 that comprises a fixed allocation of an uplink channel having implicit time division multiple access (TDMA) frame numbers on which MS 202 has the right to transmit. Signal flow diagram 500 begins when MS 202 transmits (502) a request for a PPACCH to network 252 and starts (504) a first MS PPACCH, $T_{PATCH\_MS\_1}$, 208. First MS PPACCH timer 208 counts down a first time period during which MS 202 may transmit measurements to network 252 and is intended to prevent an inactive MS from endlessly transmitting measurements. Upon expiration of first MS PPACCH timer 208, MS 202 ceases transmitting measurements to network 252. However, MS 202 may, at any time, refresh, that is, restart, first MS PPACCH timer 208. For example, when MS 202 realizes that first MS PPACCH timer 208 has expired or is about to expire and the MS has further PPACCH data to transmit via PPACCH 302, the MS may refresh or restart first MS PPACCH timer 208. The duration of first time period is up to a designer of communication system 200 is not critical to the present invention. Unless otherwise specified herein, functions performed by MS 202 and controller 232 are respectively performed by processor 204 of the MS and processor 234 of the controller. In addition, unless otherwise specified herein, functions performed by network 252 are performed by a serving controller 232, and in particular by a processor 234 of the serving controller.

In response to receiving the request, network 252, and in particular controller 232 of network 252, grants (506) an allocation of a PPACCH 302 to the MS. However, in another embodiment of the present invention, network 252 may allocate PPACCH 302 to MS 202 on its own initiative, without first receiving a request from the MS (that is, absent step 502). The allocation of PPACCH 302 comprises an allocation of PPACCH parameters, which parameters define a VACCH 310 on which MS 202 has a right to transmit. The PPACCH parameters include a starting Absolute Frame Number (AFN(s)) corresponding to a first VACCH 310 on which MS 202 has a right to transmit, an Allocation Divisor 'M' which controls when the MS has the right to transmit, and an uplink timeslot allocation (0–7) to which VACCH 310 is assigned. Network 252 then conveys (508) the PPACCH parameters to MS 202.

In response to receiving the PPACCH parameters, MS 202 stores the PPACCH parameters in the at least one memory device 206 of the MS. MS 202, and in particular PPACCH logical controller 412, further determines (510) whether a PACCH 308 is available for use as a PPACCH 302, that is, whether the PPACCH may be mapped to an available PACCH.

When MS 202, and in particular PPACCH logical controller 412, determines (510) that a PACCH 308 is not available, for example, when no TBF is available for a transmission of a first block of PPACCH data due to an absence of voice data for transmission, the PPACCH logical controller maps PPACCH 302 to VACCH 310. MS 202 further holds off transmitting until a time corresponding to the starting Absolute Frame Number, AFN(s) and then transmits the first block of PPACCH data via the VACCH. That is, when a PACCH 308 is not available, MS 202 transmits (512) the PPACCH data over PPACCH 302 by use of VACCH 310, which VACCH corresponds to an allocated timeslot 'NOT (AFN(s) mod M)' of a frame beginning at frame number AFN(s). Also, MS 202 starts (514) a second MS PPACCH timer, $T_{PATCH\_MS\_2}$, 209. When network 252 receives the PPACCH data from MS 202 via VACCH 310, that is, in the allocated timeslot, the network starts (516) a network PPACCH timer, $T_{PATCH\_NETWORK}$, 238.

When MS 202, and in particular PPACCH logical controller 412, determines (510) that a PACCH 308 is available for transmission of the PPACCH data, the PPACCH logical controller maps PPACCH 302 to the available PACCH 308 and MS 202 transmits (518) the PPACCH data via the PACCH. In this manner, network 252 establishes a VACCH 310 and MS 202 and network 252 implement a PPACCH 302 by use of a PACCH 308 when available and the established VACCH 310 when a PACCH is not available.

Each block of PPACCH data that MS 202 is required to transmit may then be transmitted by repeating the above procedure. For example, with respect to a second block of PPACCH data, MS 202, and in particular PPACCH logical controller 412, again determines (520) whether a PACCH 308 is available for use as a PPACCH 302. When MS 202, and in particular PPACCH logical controller 412, determines (520) that a PACCH 308 is not available, the PPACCH logical controller again maps the PPACCH 302 to VACCH 310 and MS 202 transmits (522) the second block of PPACCH data over PPACCH 302 on VACCH 310, that is, in an allocated timeslot at 'NOT (AFN mod M).' MS 202 also re-starts (524) second MS PPACCH timer 209. When network 252 receives the second block of PPACCH data from MS 202 on VACCH 310 in the allocated timeslot, the network re-starts (526) network PPACCH timer 238. When MS 202, and in particular PPACCH logical controller 412, determines (520) that a PACCH 308 is available, then the PPACCH logical controller maps PPACCH 302 to the available PACCH 308 and MS 202 transmits the second block of PPACCH data over PPACCH 302 on the PPACCH.

When MS 202 has no further PPACCH data for transmission via PPACCH 302, then MS 202 holds off transmitting (528) on VACCH 310 for a time period equal to or greater than the second MS PPACCH timer 209. Second MS PPACCH timer 209 and network PPACCH timer 238 are respectively used by MS 202 and network 252 to determine a time period until termination of an allocation of resources for PPACCH 302. The time periods measured by each of second MS PPACCH timer 209 and network PPACCH timer 238 are up to a designer of communication system 200 and are not critical to the present invention. When MS 202 determines (530) that second MS PPACCH timer 209 has expired, the MS realizes that it can no longer transmit on PPACCH 302. When network 252 determines (532) that network PPACCH timer 238 has expired, the network realizes that it can re-allocate the resources, that is, the PACCH and VACCH, allocated to MS 202 for transmission of PPACCH data.

The implementation of the PPACCH described with respect to FIG. 5 provides an advantage that the Divisor 'M' may be set by network 252 to offer a certain data rate. In addition, network 252 has a priori knowledge of MS 202's assignment, enabling a simple algorithm for sharing the uplink timeslot with other MSs in communication system 200 for use by best effort packet data transfer services. It is also possible to share the uplink timeslot with other MSs and provide PPACCH service using the VACCH for each of multiple MSs. The value of 'M' then sets the maximum number of MSs that may share the timeslot, wherein the VACCH assigned to each of the multiple MSs is separately defined by varying an AFN(s) for each MS allocation.

Figure 6:
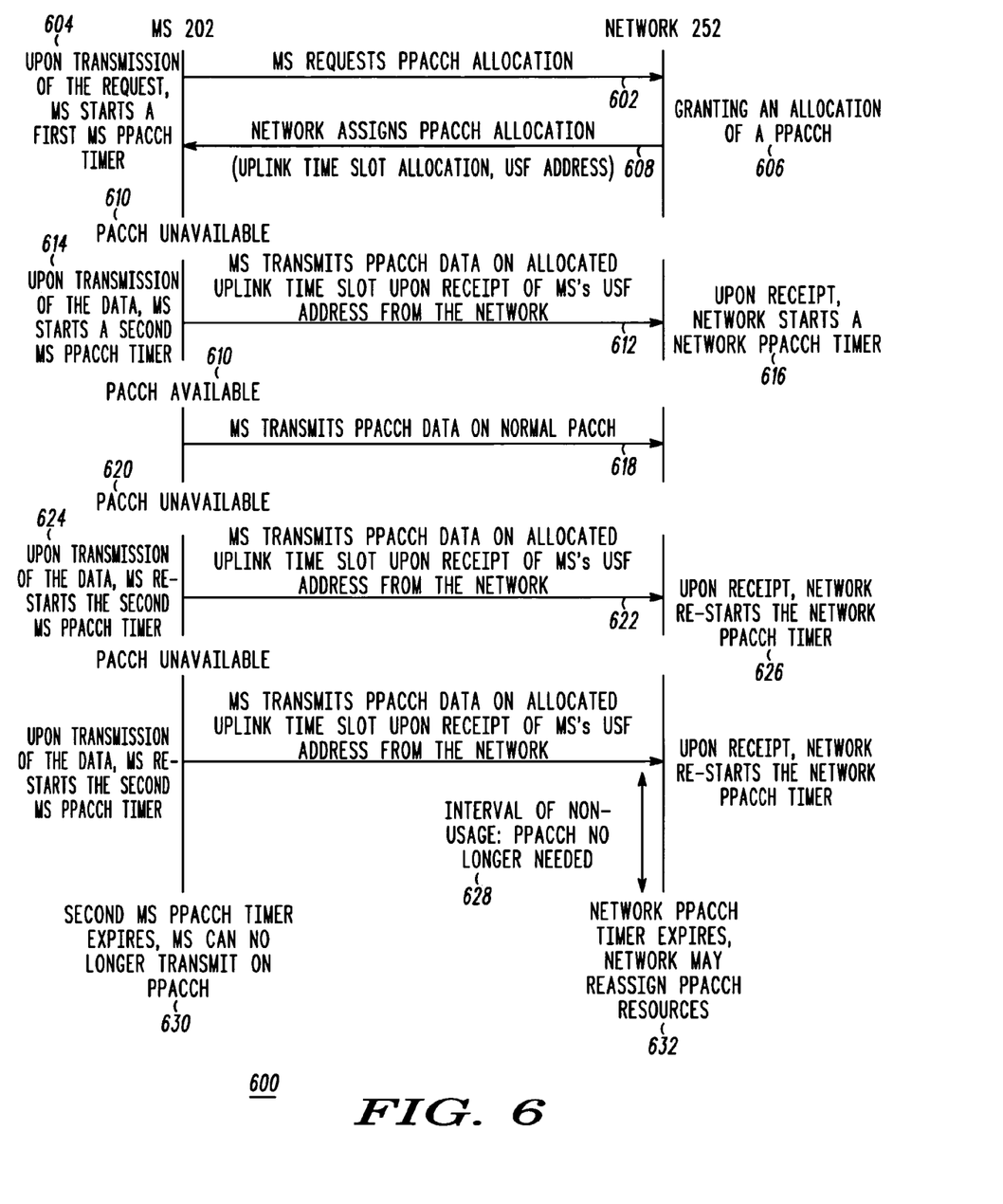
FIG. 6 is a signal flow diagram of a method for implementing a continuous, persistent packet data control channel in accordance with another embodiment of the present invention.

A disadvantage of the PPACCH service illustrated in FIG. 5 is that the allocation of the VACCH requires signaling not currently defined by the GPRS standards and the service provides a fixed allocation of the VACCH, that is, the VACCH may not be changed by network 252 without additional signaling. As a result, in another embodiment of the present invention, VACCH 310 may be dynamically controlled by network 252 by use of an existing Uplink State Flag (USF) mechanism. Such an embodiment is illustrated in FIG. 6, which depicts a signal flow diagram 600 of a method for implementing a PPACCH 302 by communication system 200 by use of a USF.

Signal flow diagram 600 begins when MS 202 transmits (602) a request for a PPACCH to network 252 and starts (604) first MS PPACCH timer 208. Similar to signal flow diagram 500, upon expiration of first MS PPACCH timer 208 MS 202 ceases transmitting measurements to network 252. However, MS 202 may, at any time, refresh or restart first MS PPACCH timer 208. In response to receiving the request, network 252, and in particular network controller 232 of network 252, (606) grants an allocation of a PPACCH 302 to MS 202. However, in another embodiment of the present invention, network 252 may allocate PPACCH 302 to MS 202 on its own initiative, without first receiving a request from the MS (that is, absent step 602). Similar to signal flow diagram 500, the allocation of PPACCH 302 comprises an allocation of PPACCH parameters, which parameters define a VACCH 310 on which MS 202 has a right to transmit. However, unlike signal flow diagram 500, the PPACCH parameters comprise an MS Uplink State Flag (USF) assignment and an uplink timeslot allocation (0–7) to which VACCH 310 is assigned. Network 252 then conveys (608) the PPACCH parameters to MS 202 and the MS 202 stores the PPACCH parameters in the at least one memory device 206 of the MS.

Network 252 then controls access to the PPACCH by use of the USF. When network 252 determines that MS 202 may access the PPACCH, the network conveys the assigned USF to MS 202. While awaiting the USF, MS 202 queues the PPACCH data. MS 202, and in particular PPACCH logical controller 412, determines (610) whether a PACCH 308 is available for use as a PPACCH 302, that is, whether the PPACCH may be mapped to an available PACCH. When PPACCH logical controller 412 determines (610) that a PACCH 308 is not available, for example, when no TBF is available for a transmission of PPACCH data due to an absence of voice data for transmission, the PPACCH logical controller maps PPACCH 302 to VACCH 310 and, in response to receiving the USF, MS 202 transmits a first block of PPACCH data via the VACCH. That is, when a PACCH 308 is not available, MS 202 transmits (612) the PPACCH data over PPACCH 302 by use of VACCH 310, which VACCH corresponds to the assigned timeslot after receiving the MS's USF. MS 202 further starts (614) second MS PPACCH timer 209. When network 252 receives the first block of PPACCH data on VACCH 310 via the assigned timeslot from MS 202, the network starts (616) network PPACCH timer 238.

When MS 202, and in particular PPACCH logical controller 412, determines (610) that a PACCH 308 is available for transmission of the PPACCH data, the PPACCH logical controller maps PPACCH 302 to the available PACCH 308 and MS 202 transmits (618) the PPACCH data via the PACCH. In this manner, network 252 establishes a VACCH 310, implements, with MS 202, a PPACCH 302 by use of a PACCH 308 when available and the established VACCH 310 when a PACCH is not available, and dynamically controls access to the PPACCH.

The above procedure may then be repeated for each transfer of a block of PPACCH data. For example, with respect to a second block of PPACCH data, MS 202 again waits to receive the assigned USF. MS 202, and in particular PPACCH logical controller 412, determines (620) whether a PACCH 308 is available for use as a PPACCH 302. When PPACCH logical controller 412 determines (620) that a PACCH 308 is not available for transmission of the second block of PPACCH data, the PPACCH logical controller maps PPACCH 302 to VACCH 310 and, in response to receiving the assigned USF, MS 202 transmits (622) the second block of PPACCH data over PPACCH 302 via VACCH 310 and the assigned timeslot. MS 202 also re-starts (624) second MS PPACCH timer 209. When network 252 receives the second block of PPACCH data from MS 202 over VACCH 310 in the assigned timeslot, the network re-starts (626) the network PPACCH timer 238. When PPACCH logical controller 412 determines that a PACCH 308 is available for transmission of the second block of PPACCH data, the PPACCH logical controller maps PPACCH 302 to the PACCH and MS 202 transmits the second block of PPACCH data over PPACCH 302 via the available PACCH 308.

When MS 202 has no further PPACCH data for transmission via PPACCH 302, then MS 202 holds off transmitting (628) on the VACCH 310 for a time period equal to or greater than the second MS PPACCH timer 209. Similar to signal flow diagram 500, second MS PPACCH timer 209 and network PPACCH timer 238 are respectively used by MS 202 and network 252 to determine a time period until termination of an allocation of resources for PPACCH 302. When MS 202 determines (630) that second MS PPACCH timer 209 has expired, the MS realizes that it can no longer transmit on PPACCH 302. When network 252 determines (632) that network PPACCH timer 238 has expired, the network realizes that it can re-allocate the resources, that is, the PACCH and VACCH, allocated to MS 202 for transmission of PPACCH data.

By using the USF mechanism, network 252 is able to dynamically control access to the PPACCH 302, that is, is able to dynamically allocate the PPACCH, by use of a known signal. When MS 202 requests a PPACCH service, network 252 grants MS 202 the right to transmit every 'M' TDMA frames via the USF mechanism. 'M' may be a fixed period, as in signal flow diagram 500, or may be a variable period having an average value that would permit adequate transmission of the uplink data from MS 202 to network 252. MS 202, in response to receiving the acknowledgement of PPACCH setup, then operates as described above, transmitting PPACCH data sent on the logical PPACCH channel over a PACCH 308 if the PACCH is available or queueing PPACCH data for transmission over the VACCH 310 whenever the MS is granted the right to transmit via the USF mechanism.

Referring now to FIG. 4, in another embodiment of the present invention, a logical binding may exist between an RR Sublayer 402 of MS 202 and each of multiple applications, such as PTT, in an Application Layer (not shown) that resides above the RR Sublayer 402. As a result, an application running on processor 204 of MS 202 may selectively request the services of PPACCH logical controller 412.

In still another embodiment of the present invention, MS 202 may decide whether to activate the PPACCH service based on a general heuristic that would activate the PPACCH whenever a simplex TBF is established, which service would then persist for a certain period of time. A pattern recognition function implemented in processor 204 of MS 202 would recognize an initiation of a simplex downlink TBF based on certain TBF utilization patterns maintained in the at least one memory device 206 of the MS.

In addition, although FIGS. 5 and 6 describe the PPACCH service as being MS requestable, the establishment of a PPACCH 302 need not be limited to MS requests. In yet other embodiments of the present invention, the PPACCH service may be network requestable or, optionally, always available.

In still another embodiment of the present invention, there may be time periods during which MS 202 does not have any uplink information to transmit to network 252 prior to PPACCH timers 209 and 238 expiring. In these instances, MS 202 may further convey a "keep alive" message to the network 252 as long as the MS intends to utilize the PPACCH.

In yet another embodiment of the present invention, MS 202 may be capable of detecting whether or not the establishment or continuing operation of PPACCH 302 has failed, in which event MS 202 may return to a quiescent state of inactivity, requiring subsequent setup. The detection of a failure of the PPACCH may be achieved by providing periodic acknowledgements and/or other periodic check pointing information for MS 202 from network 252. However, this should not be a problem for the network 252, since the network may employ the data last received on the PACCH as a checkpoint from the MS.

By implementing a Persistent PACCH (PPACCH) 302, communication system 200 provides a continuous uplink control channel that provides for a continuous exchange of control information, such as system information (SI) messages and handoff-related information. In an MS such as MS 202, PPACCH 302 is implemented by a PPACCH logical controller 412 that is, in turn, implemented in a processor 204 of the MS, which logical controller maps PPACCH 302 to PACCH 308 when the PACCH is available and to a Packet Virtual Associated Control Channel (P-VACCH, or VACCH) 310 when PACCH 308 is not available. That is, PPACCH 302 is a logical channel that is carried by PACCH 308 when the PACCH is available and by VACCH 310 when PACCH is not available, such as between uplink TBFs 304. VACCH 310 is an uplink channel assignment that is used for control purposes and that is defined by PPACCH parameters conveyed by network 252 to the MS. VACCH 310 allows an MS, such as MS 202, without an uplink TBF to pass information to network 252. PPACCH 302 persists over the course of the application session even in the absence of an uplink TBF 304 and therefore is valuable for applications such as Push-to-Talk (PTT) and may other applications in the Internet Packet Multimedia domain that require a real-time exchange of control data.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for transmitting uplink control data in a General Packet Radio System (GPRS) communication system comprising:
   when a packet associated control channel (PACCH) is available, transmitting the control data via the packet associated control channel; and
   in one or more intervening intervals, which intervening intervals each occurs between availabilities of the packet associated control channel and during which intervals the packet associated control channel is not available, transmitting the control data via an uplink timeslot allocated for the transmission of the control data.

2. The method of claim 1, wherein transmitting the control data when a packet associated control channel is not available comprises transmitting the control data via a virtual associated control channel that comprises at least one timeslot allocated by a network for transmission of the control data.

3. The method of claim 1, further comprising:
   transmitting a request for a persistent, packet associated control channel; and
   in response to transmitting the request, receiving an allocation of the timeslot.

4. The method of claim 1, wherein the allocated timeslot is defined by a modulus relationship between an Absolute Frame Number (AFN) associated and an Allocation Divisor 'M' which controls when the mobile station has the right to transmit on the timeslot.

5. The method of claim 1, wherein the allocated timeslot is defined by a mobile station Uplink State Flag (USF) assignment and an assigned timeslot number.

6. The method of claim 1, further comprising starting a timer in response to transmitting the control data in the allocated timeslot.

7. The method of claim 6, further comprising ceasing to use the allocated timeslot upon expiration of the timer.

8. The method of claim 6, wherein the control data comprises first control data and wherein the method further comprises:
   when a packet associated control channel is available, transmitting second control data via the packet associated control channel;
   when a packet associated control channel is not available, transmitting the second control data via a timeslot allocated for the transmission of the control data; and
   restarting the timer.

9. The method of claim 6, wherein the control data is transmitted by a mobile station and wherein the method further comprises, when the mobile station does not have any further packet data to transmit prior to the timer expiring, conveying by the mobile station a "keep alive" message for as long as the mobile station intends to utilize the allocated timeslot.

10. A mobile station, operating in a General Packet Radio System (GPRS) communication system, comprising:
    at least one memory device that maintains information concerning a packet associated control channel (PACCH) and a timeslot allocated for transmission of control data when the packet associated control channel is not available; and
    a processor operably coupled to the at least one memory device that conveys the control data via the packet associated control channel when the packet associated control channel is available and in one or more intervening intervals, which intervening intervals each occurs between availabilities of the packet associated control channel and during which intervals the the packet associated control channel is not available, conveys the control data via the timeslot.

11. The mobile station of claim 10, wherein, when a packet associated control channel is not available, die processor conveys the control data via a virtual associated control channel that is a portion of the timeslot.

12. The mobile station of claim 10, wherein the processor further conveys a request for a persistent, packet associated control channel and, in response to conveying the request, receives an allocation of the timeslot.

13. The mobile station of claim 10, wherein the at least one memory device maintains the allocated timeslot by maintaining an Absolute Frame Number (AFN) and an Allocation Divisor 'M' which controls when the mobile station has the right to transmit.

14. The mobile station of claim 10, wherein the at least one memory device maintains the allocated timeslot by maintaining a mobile station Uplink State Flag (USP) assignment and an assigned timeslot number.

15. The mobile station of claim 10, further comprising a timer and wherein the processor starts the timer when the processor conveys the control data in the allocated timeslot.

16. The mobile station of claim 15, wherein the processor ceases use of die allocated timeslot upon expiration of the timer.

17. The mobile station of claim 15, wherein the control data comprises first control data and wherein the processor further transmits second control data via the packet associated control channel when a packet associated control channel is available, transmits the second control data via a timeslot allocated for the transmission of the control data when a packet associated control channel is not available, and, in response to transmitting the second control data, restarts the timer.

18. The mobile station of claim 15, wherein, when the mobile station does not have any further packet data to transmit prior to the timer expiring, the processor conveys a "keep alive" message for as long as the mobile station intends to utilize the allocated timeslot.

19. A method for transferring uplink control data in a General Packet Radio System (GPRS) communication system comprising:

receiving a request for a persistent, packet associated control channel (PACCH); and in response to receiving the request, conveying an allocation of an uplink timeslot to a mobile station for use by the mobile station to transmit control data in the uplink timeslot during one or more intervals between availabilities of a packet associated control channel (PACCH), during which intervals the packet associated control channel is not available.

20. The method of claim 19, wherein conveying an allocation of a timeslot comprises, in response to receiving the request, conveying an Absolute Frame Number (AFN) and an Allocation Divisor 'M' which controls when the mobile station has the right to transmit.

21. The method of claim 19, wherein conveying an allocation of a timeslot comprises, in response to receiving the request conveying a mobile station Uplink State Flag (USF) assignment and an assigned timeslot number.

22. The method of claim 19, further comprising:
when a packet associated control channel is available, receiving the control data via the packet associated control channel; and
when a packet associated control channel is not available, receiving the control data via the timeslot allocated for the transmission of the control data.

23. The method of claim 22, further comprising, when the control data is received in the allocated timeslot, starting a tinier.

24. The method of claim 23, wherein the request is received from a first mobile station and wherein the method further comprises holding off re-allocation of the timeslot to a second mobile station until expiration of the timer.

25. The method of claim 23, wherein the control data comprises first control data and wherein the method further comprises:
when a packet associated control channel is available, receiving second control data via the packet associated control channel;
when a packet associated control channel is not available, receiving the second control data via a timeslot allocated for the transmission of the control data; and
in response to receiving the second control data, restarting the timer.

26. A network controller, in a General Packet Radio System (GPRS), comprising a processor that receives a request from a mobile station for a persistent, packet associated control channel (PACCH) and, in response to receiving the request, conveys an allocation of an uplink timeslot for use by the mobile station to transmit control data during one or more intervals between availabilities of a packet associated control channel, during which intervals the packet associated control channel is not available.

27. The network controller of claim 26, wherein the processor conveys an allocation of a timeslot by conveying an allocation of a timeslot comprises, in response to receiving the request, conveying an Absolute Frame Number (AFN) and an Allocation Divisor 'M' which controls when the mobile station has the tight to transmit.

28. The network controller of claim 26, wherein the processor conveys an allocation of a timeslot by conveying a mobile station Uplink State Flag (USF) assignment and an assigned timeslot number.

29. The network controller of claim 26, wherein, when a packet associated control channel is available, the processor receives the control data via the packet associated control channel and when a packet associated control channel is not available, the processor receives the control data via the timeslot allocated for the transmission of the control data.

30. The network controller of claim 29, further comprising a timer and wherein the processor starts the timer when the control data is received in the allocated timeslot.

31. The network controller of claim 30, wherein the request is received from a first mobile station and wherein the processor holds off re-allocation of the timeslot to a second mobile station until expiration of the timer.

32. The network controller of claim 30, wherein the control data comprises first control data and wherein the processor further, when a packet associated control channel is available, receives second control data via the packet associated control channel, when a packet associated control channel is not available, receives the second control data via a timeslot allocated for the transmission of the control data, and, in response to receiving the second control data, restarts the timer.

33. A method for transmitting uplink control data comprising channel measurements in a General Packet Radio System (GPRS) communication system comprising:
when a packer associated control channel (PACCH) is available, transmitting control data comprising channel measurements via the packet associated control channel; and
in one or more intervening intervals, which intervening intervals each occurs between availabilities of the packet associated control channel and during which intervals the packet associated control channel is not available, transmitting the control data via an uplink timeslot allocated for the transmission of the control data.

34. The method of claim 33, wherein transmitting the control data when a packet associated control channel is not available comprises transmitting the control data via a virtual associated control channel that comprises at least one timeslot allocated by a network for transmission of the control data.

35. A method for transferring uplink control data comprising channel measurements in a General Packet Radio System (GPRS) communication system comprising:
receiving a request for a persistent, packet associated control channel (PACCH) from a mobile station; and
in response to receiving the request, conveying an allocation of an uplink timeslot for used by the mobile station to transmit control data comprising channel measurements in the uplink time slot during intervening intervals between availabilities of the packet associated control channel and during which intervals the packet associated control channel is not available.

36. The method of claim 35, wherein conveying an allocation of a timeslot comprises, in response to receiving the request, conveying a mobile station Uplink State Flag (USF) assignment and an assigned timeslot number.

* * * * *